(12) United States Patent
Ronaldi

(10) Patent No.: US 9,043,944 B2
(45) Date of Patent: May 26, 2015

(54) SYSTEM AND METHODOLOGY FOR SELECTIVELY CONTROLLING THE TRANSMISSION OF CONTENT

(71) Applicant: Jeffrey Ronaldi, McLean, VA (US)

(72) Inventor: Jeffrey Ronaldi, McLean, VA (US)

(*) Notice: Subject to any disclaimer, the term of this patent is extended or adjusted under 35 U.S.C. 154(b) by 73 days.

(21) Appl. No.: 13/746,176

(22) Filed: Jan. 21, 2013

(65) Prior Publication Data

US 2014/0208443 A1    Jul. 24, 2014

(51) Int. Cl.
*H04L 29/06* (2006.01)

(52) U.S. Cl.
CPC .......... *H04L 63/102* (2013.01); *H04L 63/0227* (2013.01)

(58) Field of Classification Search
CPC ....... H04L 63/08; H04L 63/102; H04L 63/10; H04L 63/0227; G06F 21/6218; H04W 12/06; G06N 5/02
USPC .......................................................... 726/4
See application file for complete search history.

(56) References Cited

U.S. PATENT DOCUMENTS

| | | | |
|---|---|---|---|
| 8,532,633 B2 * | 9/2013 | Ramer et al. ................ | 455/414.1 |
| 2003/0096605 A1 * | 5/2003 | Schlieben et al. ............ | 455/419 |
| 2007/0073874 A1 * | 3/2007 | Moghaddam et al. ........ | 709/224 |
| 2012/0233252 A1 * | 9/2012 | Vats et al. ..................... | 709/204 |
| 2012/0323590 A1 * | 12/2012 | Udani .............................. | 705/2 |
| 2014/0020108 A1 * | 1/2014 | John et al. ....................... | 726/26 |
| 2014/0142805 A1 * | 5/2014 | Frye ............................... | 701/36 |

* cited by examiner

*Primary Examiner* — Michael Chao
*Assistant Examiner* — Shu Chun Gao
(74) *Attorney, Agent, or Firm* — Symbus Law Group; Charles B. Lobsenz

(57) ABSTRACT

According to one aspect of the present invention, a system and methodology is provided which controls whether or not content is permitted to be transmitted from a source device depending upon the nature of the content and/or other factors more fully described herein. Source devices may include devices such as mobile phones, tablets, netbooks, laptops, desktop computers, and any other devices which are capable of transmitting content which is resident on such device. As an example, inappropriate photographs may be identified by the system of the present invention, and when a user attempts to transmit one or more of these photographs, the system will prevent the user from doing so.

19 Claims, 4 Drawing Sheets

SYSTEM AND METHODOLOGY FOR SELECTIVELY CONTROLLING THE TRANSMISSION OF CONTENT

FIELD OF THE INVENTION

The present invention relates generally to the control of content in electronic form and more particularly to a system and method that selectively controls the transmission of electronic content from various devices and platforms based upon predetermined conditions.

BACKGROUND OF THE INVENTION

Technology is prevalent in our daily lives. In this day and age, it is next to impossible to go through a day without using or being impacted by technology in some way. One area in which this is especially true is with respect to the way we communicate. Most people carry some form of wireless device with them throughout much or all of the day. Popular devices include smartphones, tablets, netbooks, notebooks and other products that allow users to communicate with others wherever they may be so long as they are in range of a long range or local wireless network or a wired network to which they have access.

These devices are used for personal and business purposes and, among other things, they provide the capability for users to communicate by transmitting and receiving information in the form of either or both of voice and/or data. In the case of data, communications may take the form of emails, texts, SMS, and other formats as well as various attachments and other content that may be included in the communication. For example, emails may be accompanied by various attachments which are communicated along with the email message such as documents, pictures, spreadsheets, presentations, music files, recorded messages, links to web pages, etc.

While all of the above provide conveniences and accessibility as people move about through their daily lives which were heretofore unavailable prior to these technological developments, there do exist concerns and drawbacks associated with these capabilities. One key concern is that of parents and others concerned about children's access to inappropriate content in various forms. Because many children have access to these mobile devices as well as other equipment located in homes and schools, and because these children often communicate with each other using these devices and equipment, there is the risk that some of the content shared between and among these children is inappropriate or otherwise undesirable.

There exist many tools available for mobile devices as well as other computing platforms, such as desktop computers, which allow parents, teachers and other responsible adults to control access to content in various contexts. Many of these tools are software based and reside on the receiving device. These tools typically run continuously and monitor content so as to prevent content otherwise available on the device or equipment from being accessed by all users or some subset of users. Various designated categories and characteristics for content can be specified for censoring while content not meeting these categories and characteristics is permitted to be accessed, viewed, and/or used as applicable.

By way of example, as a general matter, all television sets manufactured for the United States market starting in 2000 are required to have a "V-chip". This device allows for parental control of broadcast content which is viewable by children based upon ratings category. Users which have the password (such as parents) can override the protection as desired and view content which would not be viewable to those without the password (such as children).

In the context of computing devices, various types of filtering applications are also known. These again typically take the form of software applications residing on the applicable device. Alternatively, filtering can be accomplished via network infrastructure such as proxy servers. Filters can be implemented in various manners such as those that are browser based, email filters which act on information contained in the mail body and headers, and client side filters which are implemented as software on the computing device which can be managed by those with administrative level privileges.

While the aforementioned collection of filtering and content control solutions are effective and provide the desired result in many contexts, there does not yet exist a safe, reliable, robust and effective means for controlling content prior to the transmission of the content particularly with respect to content which is to be transmitted by a mobile device. It is advantageous for content to be controlled at the source device rather than the destination device for a number of reasons.

For example, merely having inappropriate or illegal content on a device can be problematic regardless of whether it can be accessed by unauthorized users or not. In the case of child pornography, for example, the mere fact that such content is resident on a device can have severe legal ramifications regardless of whether or not there are content controls with respect to the access to or use of such content by a subset of users. This also applies to other information and content where it is a significant advantage never to receive such content at all as opposed to receiving such content or information but limiting access to it on the destination device.

One practical example is a child who habitually transmits inappropriate content to other children who are otherwise innocent and do not desire to receive such content. While it is possible to censor such content on each of the receiving devices to which the content is transmitted, it is even more effective to stop that content at its source such that it never reaches innocent users or others that would prefer not to receive the content at all.

SUMMARY OF THE INVENTION

It is thus a primary object of the invention to provide a system and methodology that addresses the shortcomings of the prior art as discussed above.

It is another object of the present invention to provide a system and methodology which implements content control on a multitude of devices and platforms such that content is analysed and controlled at the source device prior to being transmitted.

It is a further object of the present invention to provide a system and methodology which provides flexible capability in restricting a subset of content resident on a source device from being transmitted to any destination devices, applications or other environments where such content could be viewed, accessed or used.

It is a still further object of the present invention to provide a system and methodology which provides flexible capability in restricting a subset of content resident on a source device from being transmitted to selected types and categories of destination devices, applications and other environments where such content could be viewed, accessed or used.

It is a yet further object of the present invention to provide the capability to restrict certain content from being transmitted from a variety of mobile devices based on certain preselected criteria.

It is an even further object of the present invention to provide an application which selectively blocks content from being transmitted from mobile devices or other computing devices based not only on the type of content but also upon the nature of the intended recipient.

It is a still further object of the present invention to provide an application which selectively blocks content from being transmitted to recipients that are categorized as individual users/individual devices, while allowing that same content to be transmitted to recipients that are categorized as social media related destinations.

It is a yet further object of the present invention to provide an application that selectively blocks content from being transmitted from a variety of devices wherein the selectivity is dependent upon one or more of the following: category of intended destination/recipient; category of intended recipient device; URL address of intended destination website; identity of the user of the source device attempting transmission; nature of content intended to be transmitted.

According to one aspect of the present invention, a system and methodology is provided which controls whether or not content is permitted to be transmitted from a source device depending upon the nature of the content and/or other factors more fully described herein. Source devices may include devices such as mobile phones, tablets, netbooks, laptops, desktop computers, and any other devices which are capable of transmitting content which is resident on such device. As an example, inappropriate photographs may be identified by the system of the present invention, and when a user attempts to transmit one or more of these photographs, the system will prevent the user from doing so.

The attempted transmission which is controlled and selectively blocked may take one or more of many forms such as text messages, emails, documents, URL links, photos, and other classes of content. Based upon criteria selected by an administrator (e.g. parent), content may be selectively blocked or permitted to be transmitted. Alternatively or in addition, content meeting certain criteria may not be fully blocked from transmission but may instead be partially transmitted (e.g. an appropriate portion of a photo, an acceptable portion of a text message) or modified prior to transmission (e.g. placing a black bar over the genitals in a naked photo of a person or stripping out inappropriate language in a text message).

According to another aspect of the present invention, the system performs content screening based on a flexible and robust set of criteria designated by an administrative user (e.g. parent). These criteria may include the identity of the user attempting to make the transmission (i.e. a parent, via a password, for example, may be permitted to transmit any text message from the device while a child without the password could not transmit texts having any photo attachment or incorporating specific and inappropriate language). The criteria may also include the category of the intended recipient (e.g. all content may be permitted to be transmitted to broadly accessible recipients such as Facebook pages while some of that same content may be restricted from being transmitted to the individual devices associated with one or more users. As yet another example, the criteria may include time of intended transmission, data size of the intended transmission, specific identities of devices/phone numbers of users to whom certain content should not be transmitted as well as various other bases for determining whether or not content should be blocked or not.

According to another aspect of the present invention, the type of content to which the above discussed criteria may be applied is specified by an administrative user via an application based user interface resident either on the applicable device or remotely through a web based application in communication with one or more devices upon which it is desired for content to be controlled. In the case of the web-based application, the administrative user can specify specific criteria which determine whether content should be blocked on a device by device basis or the selected criteria could be applied across multiple devices. In this latter case, for example, a parent may have four mobile devices on a single carrier account, one for each of the parent's children, and the same criteria could be specified for all children's devices or the criteria could be varied by, for example, the children's age.

Further features and aspects of the present invention will become apparent from the following detailed description of the exemplary embodiments in connection with reference to the attached figures.

DETAILED DESCRIPTION

Figure 1:
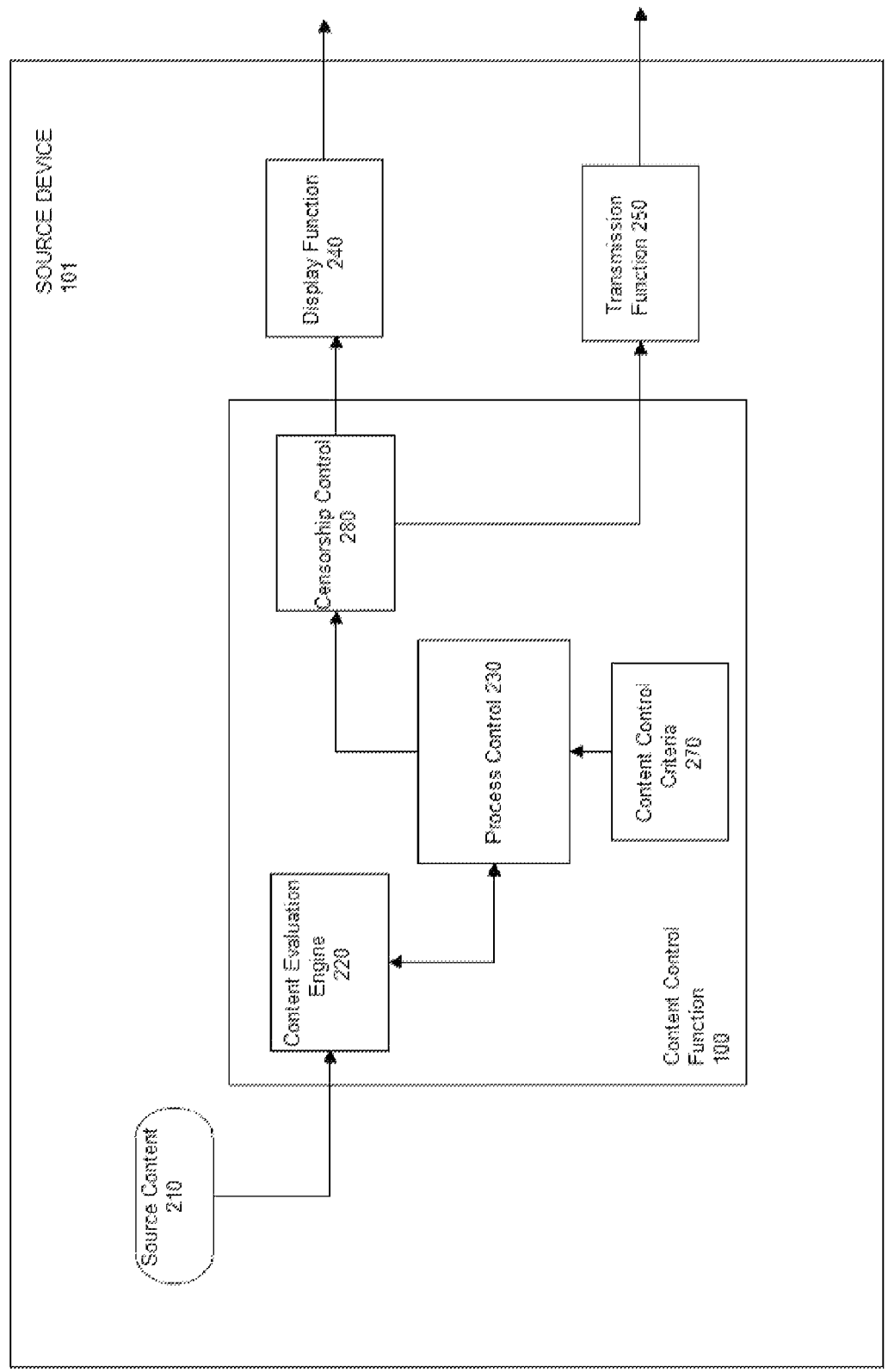
FIG. 1 is a diagram depicting an exemplary device upon which the content transmission control application aspect of the present invention resides, as well as the various components of the application in a preferred embodiment thereof.

A description of the present invention in preferred embodiments thereof, now follows. With reference now to FIG. 1, the system of the present invention, in a preferred embodiment thereof, is now described. The system of the present invention includes a number components that implement the functionality and methodologies of the present invention in a preferred embodiment. It will be understood by one of skill in the art that the system and methodologies of the present invention are described herein in the form of a number of preferred embodiments and that it is possible to deviate from these specific embodiments while still remaining within the scope and spirit of the present invention.

FIG. 1 illustrates a source device 101 and various components and processes contained thereon in a preferred embodiment of the present invention. As described above, source device 101 may comprise any device which has the capability of storing and/or transmitting content. Examples include but are not limited to mobile phones, tablets, netbooks, laptop computers and desktop computers. The following discussion assumes that the source device is a smartphone capable of sending texts, emails, and/or various attachments thereto including photos, documents and other files. As will be understood by one of ordinary skill in the art, the teachings now described are readily applicable to the other types of source devices discussed above.

Turning now to FIG. 1, content control function 100 resides on, for example a smartphone device. Content control function 100 implements the key processes described above which selectively block or permit the transmission of content from source device 101 based on a number of selected criteria. A primary component of content control function is process control 100. Process control 230 manages the processes and methodologies of the present invention as the same may be implemented on a smartphone device. In practice, process control 230 may be, for example, a software application running on a microprocessor resident on source device 101. Content evaluation engine 220, under the control of process control 230 employs the content control criteria 270 which has been set and stored for this specific source device 101 and/or for the specific user currently using source device 101.

Based upon the set content control criteria 270, content control function 100, under the control of process control 230 and content evaluation engine 220, process source content 210 as user commands resulting in the intention to transmit source content 210 are issued. In a preferred embodiment of the present invention, content control function 100, if desired by an administrative user, is running constantly while source device 101 is powered on. This way, control over content intended to be transmitted by any and all users using source device 101 is maintained at all times. Further, it is preferred that content control function 100 is as hack proof as possible given known art for doing so such that only administrative users have permission to (i) disable and/or de-install content control function 100, and (ii) select the content control criteria associated with source device 101 and/or each possible user of source device. In a preferred embodiment, this control is via assigned passwords at the administrative level (e.g. the account owner of the device and/or the parent of the user(s) of source device 101).

In the case of each intended transmission of content from source device 101, content evaluation engine 220 makes a determination based on the nature of the source content and the predetermined content control criteria 270 as to how the content should be handled. This determination is shared with censorship control 280 via process control 230 and censorship control 280 then functions to manage the source content 210 intended to be transmitted in one of three ways as more fully discussed below. The three potential ways of handling content in a preferred embodiment of the present invention is either to: (i) permit content to be transmitted; (ii) fully block content from being transmitted; or (iii) permit a portion of the content and/or a modified form of the content to be transmitted.

If content is permitted to be transmitted, censorship control 280 issues a command to transmission function 250 and the content is transmitted to the intended destination. Alternatively, if the content will be blocked, censorship control 280 may issue a command to display function 240 prompting a message to be displayed to the user indicating that content has been blocked. This is optional and it is also possible to simply block the content without messaging the user. Finally, if only a portion of the content and/or if only a modified form of the content will be permitted to be transferred, then censorship control 280 performs the necessary actions to remove the non-transmittable portions of the content and/or to modify the content before signaling transmission function 250 to transmit the content as modified and/or truncated.

Figure 2:
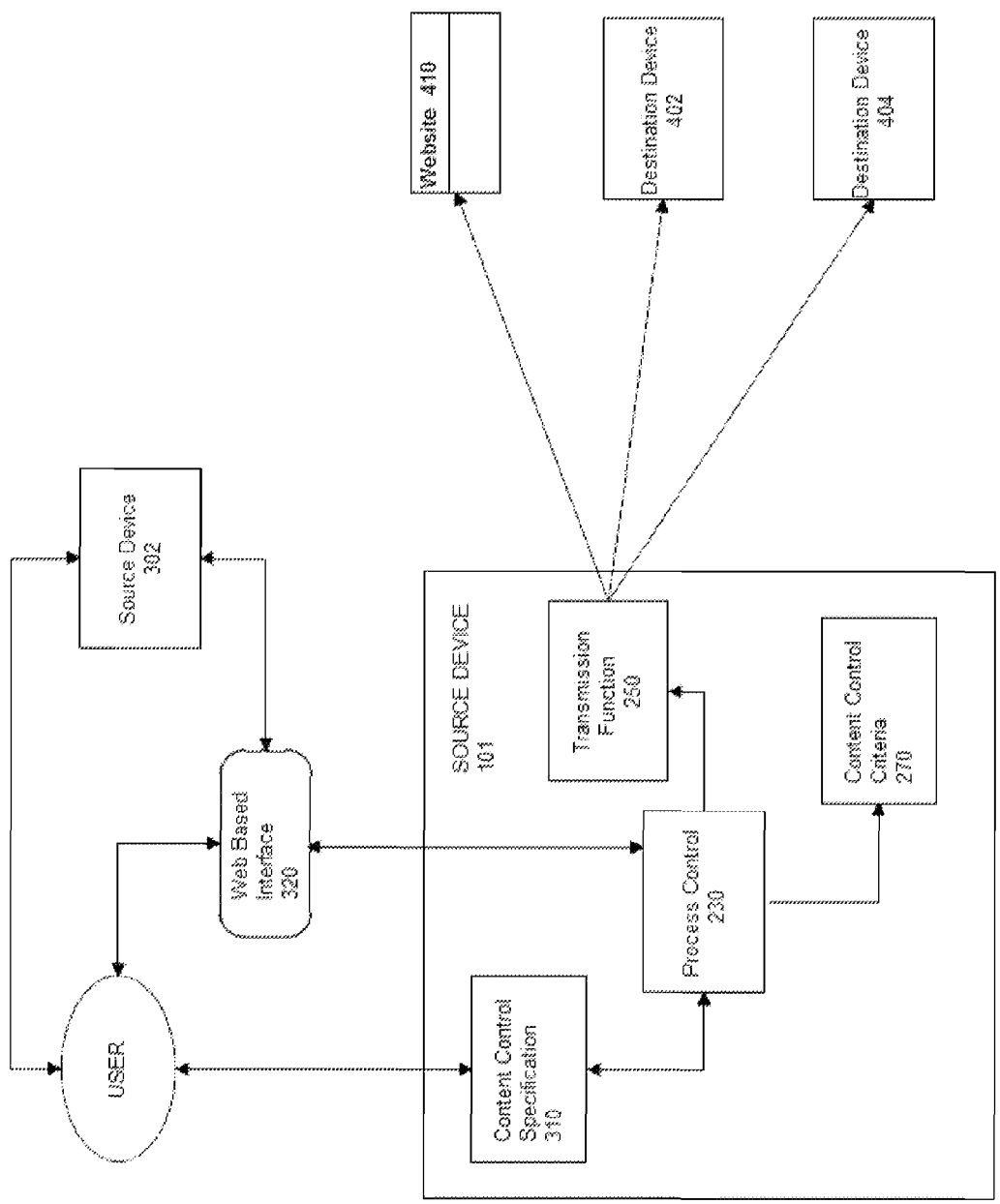
FIG. 2 is a diagram illustrating an exemplary device and the content transmission control application aspect of the present invention in a preferred embodiment thereof particularly depicting the functionality associated with selecting the criteria for determining whether or not content is blocked.

Turning now to FIG. 2, further discussion particular to the setting of content control criteria is now provided. In a preferred embodiment of the invention, an administrator (e.g. a parent) with the appropriate credentials (e.g. a password) may use the functionality of the present invention to set the content control criteria 270 intended to be applied to source device 101. As discussed above, content control criteria may apply across the board to all users of source device 101 or, alternatively, they may be set on an individual user by user basis. In a preferred embodiment, an administrative user may set content control criteria 270 either directly on source device 101 via content control specification functionality 310 or via a web-based or other external interface 320. In the latter case, an administrator for multiple source devices may easily and readily set content control criteria for a number of source devices as well as a number of users which are expected to use one or more of these source devices. This latter case is illustrated in FIG. 2 by virtue of source device 302 which may also be controlled by as well as interact with the administrative User and web based interface 320.

Web based interface 320 is preferably a graphical user interface available within a browser that may be accessed by the impacted source device 101/302 and also by any other device such as a laptop computer. In this way, an administrative user may logon either in the presence of the impacted source devices 101/302 or not and remotely set and periodically update the applicable content control criteria 270 for all users and source devices under the control of the administrative user.

As shown in FIG. 2, when content is transmitted by transmission function 250, that content may be transmitted to, for example, one or more destination devices 402 and 404 or alternatively or in addition to one or more websites 410. Of course, whether or not and to what extent the content is transmitted to these proposed destinations is dependent upon the content control criteria 270 as they are applied to the source content 210.

Figure 3:
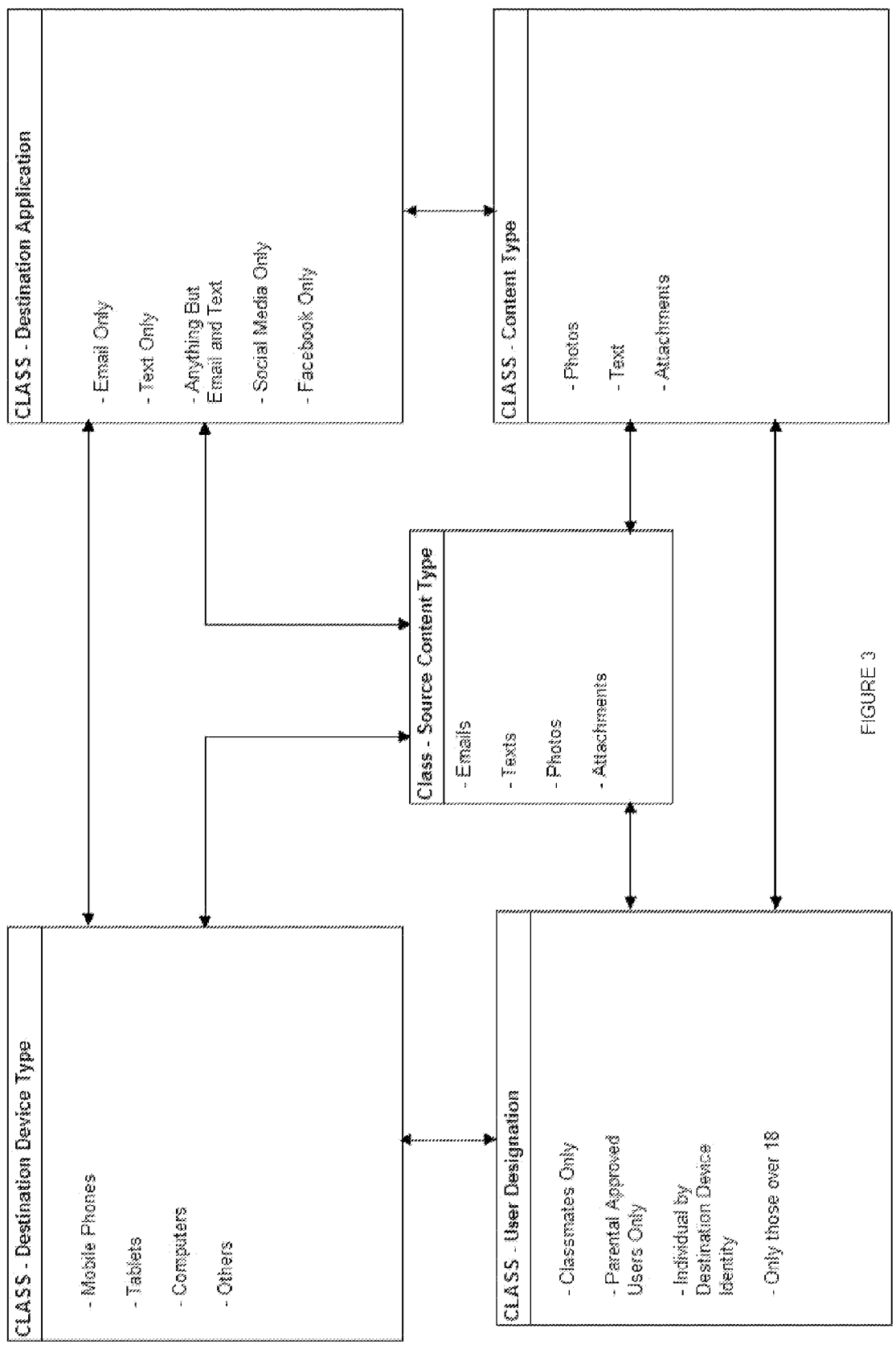
FIG. 3 is a class diagram illustrating exemplary criteria which can be used to selectively block and/or censor content according to the teachings of the present invention in a preferred embodiment thereof.

Turning now to FIG. 3, a graphical depiction of exemplary types of content control criteria 270 that may be selected is presented and is now discussed. As is readily understood by one of ordinary skill in the art, these types are merely exemplary and other levels and types of controls may also be used without departing from the scope or spirit of the present invention. Using content control specification 310 or web based interface 320, an administrative user can set various criteria with respect to content which results in the content being permitted to be transmitted, blocked, transmitted in part or modified prior to transmission. Some or all of these criteria can be applied to content in parallel so long as they are not mutually exclusive.

In a preferred embodiment, one class of criteria that may be applied relates to the intended destination device type. Content may be screened depending upon whether the intended destination device is, for example, a mobile phone, a tablet, a computer or some other device. The classification of the destination device can be obtained by source device 101 in a number of different ways. For example, the administrative user could specify all devices with which communication is permitted and classify these devices accordingly. Alternatively, or in addition, a default system message can be sent by the source device to the destination device, querying for device type which is then returned to the source device prior to a first transmission being permitted. Other methodologies are also possible as may be known in the art.

In any event, given source device having knowledge of the destination device type, transmission of content may be permitted, blocked, truncated or transmitted with modifications. For example, an administrator may configure source device 101 such that when user Jane (who is a minor) attempts to transmit a text containing the word "sex", then the transmission will be permitted to be transmitted as is to mobile phones but will be blocked for transmission to tablets and when transmission is attempted to be sent to a computer, the text will be permitted to be transmitted but the word "sex" will be deleted from the message prior to transmission. Further in this example, source device 101 may be configured such that any other user of source device 101 (all presumed over the age of 18) will not have the same restriction and all texts containing the word "sex" will be transmitted as is. These other users would log in to the application running on source device 101 to enable the configuration as it applies to them.

Another possible class of criteria might be "user designation". In this example, content may be processed for selective transmission as described above based upon belong to a class of users or not. Classes may include, for example: classmates, approved users, specific individuals (based upon the device ID associated with that person), and/or an age limit of over 18. Again, this data can be obtained by source device 101 in various ways as described above. As an example in this case, source device 101 may be configured such that if any user attempts to transmit a photo detected as containing nudity, then that transmission will be permitted only to users with a designation of "over 18".

Classes can also be combined with other classes to make control even more flexible. So for example, combining the use of the "user description" class with the "destination device type" class discussed above, a configuration may be set such that emails to mobile phones of users designated as "classmates" may be freely transmitted regardless of content whereas, if an email is transmitted to a mobile phone of a non-classmate, it would be subject to other content limitations such as no nudity, no inappropriate language, etc.

Further classes may also be used, for example, as shown in FIG. 3. By way of example, the destination application class may drive control over content. For example, content containing nudity may be permitted to be transmitted to individual email recipients but not to social media destinations such as Facebook, Pinterest, etc. Specific destination URLs may be selected for different treatment of content as well.

Another possible class for selection criteria is based on source content type as has been referenced above. In this case, for example, configuration may be set such that texts may be freely transmitted regardless of content, while photos and attachments would be limited based on content. It is also possible to control content based upon how the content will be used at the destination (content type class). So, for example, if an image will be posted as a photo at a destination website it might be blocked whereas if it is to be received as an attachment at the destination device, it might be permitted for transfer.

As will be readily understood by one of skill in the art, the above classes and the discussion with respect to FIG. 3 are merely exemplary. Other classes, categories and combinations of criteria for determining whether and to what extent content should be controlled pre-transmission are also possible while remaining within the scope and spirit of the present invention.

As noted above, according to the teachings the present invention, content can be screened for nudity, specific words and other types of undesirable and/or inappropriate components. Software and applications for accomplishing the detection of such components are well known in the art. For example, image detection software and research relating to nudity detection include the following:

Pornseer Pro offered by Yangsky/Yang's Scientific Research Institute, LLC (see www.yangsky.com)

"Appearance Based Nude Image Detection" by Chi-yoon Jeong, Jong-sung Kim, Ki-sang Hong, presented at the 17$^{th}$ International Conference on Pattern Recognition, Cambridge, UK (Aug. 23, 2004)

Figure 4:
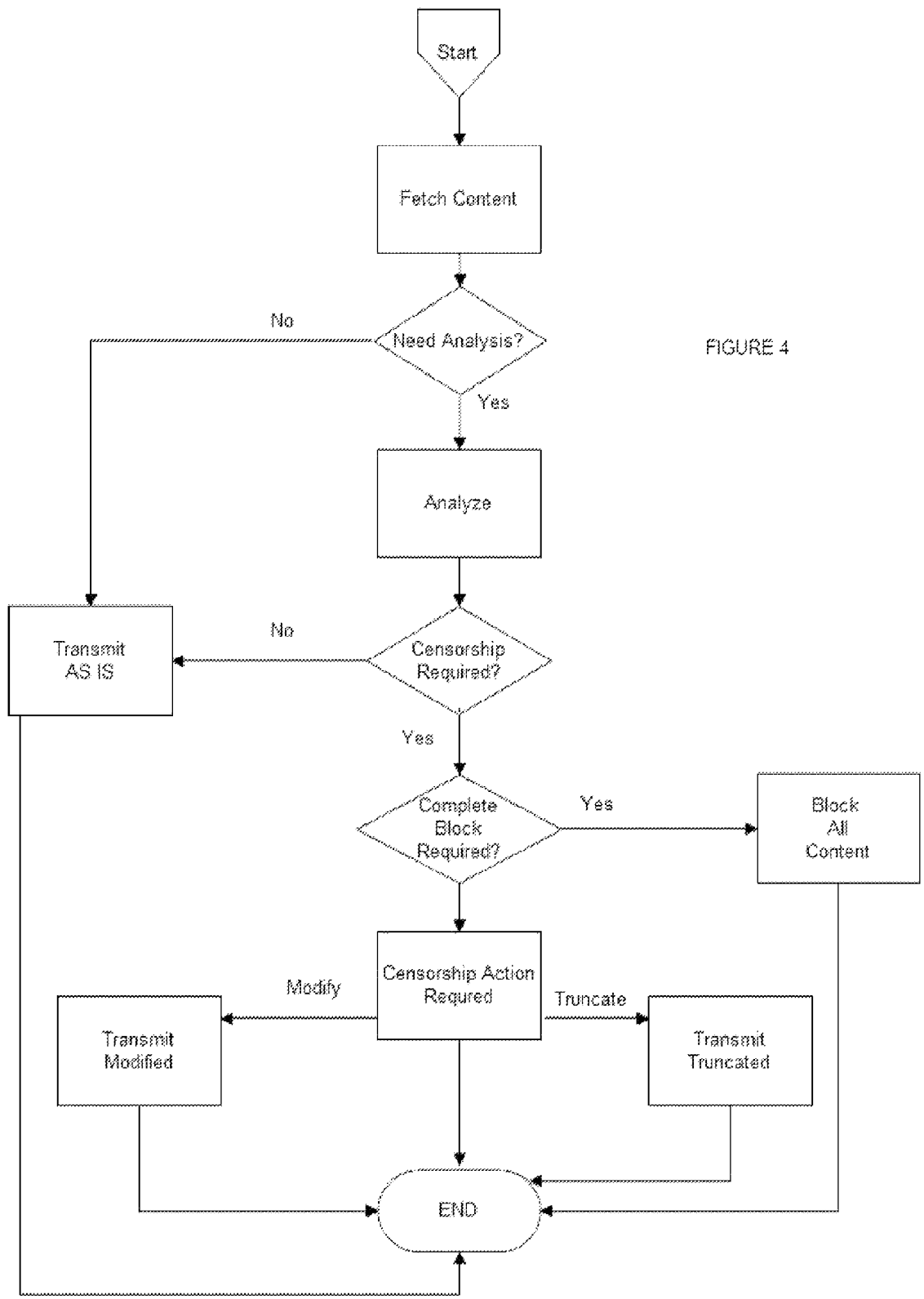
FIG. 4 is a flowchart illustrating the primary steps involved in determining whether content should be permitted to be transmitted according to the teachings of the present invention in a preferred embodiment thereof.

Turning now to FIG. 4, a flowchart depicting the key steps in processing content on source device 101 is presented and now discussed. At the start, the content intended to be transmitted is fetched for processing by content evaluation engine 220. At that point, the system determines whether analysis is required. In some cases, it may not be required because, for example, an user without any censorship restrictions has logged in or an administrator has disabled content control for whatever reason. In this case, the intended content is transmitted as is.

Alternatively, assuming that the content control function is enabled and analysis is required, the process proceeds to the next step wherein the analysis of the content is undertaken. As discussed above and depending on the preset content control criteria 270, this analysis may take the form of image analysis, text analysis, determination of the intended destination device or recipient, etc. In any event, once the analysis is completed based upon the active content control criteria, the system determines whether censorship of some kind is required. If not, the content is transmitted as is. If censorship is required, the first step is to determine whether or not all content must be blocked based upon the preset criteria. If yes, the transmission of all the content is blocked. If no, the system determines the alternative action(s). This might be a truncation where only a portion of the content is transmitted or a modification where the content is transmitted in modified form. It is also possible to transmit a truncated version of the content which is also modified.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A non-transitory computer-readable medium encoded with instructions operative to cause a computer to perform a content control method for selectively limiting or preventing a would-be transmission of specific content therefrom, the method comprising:
 providing an evaluation engine for analysing content;
 providing a set of control criteria including
 (1) at least one of the following:
  a class of source-user type; and
  a class of recipient-user type;
 (2) at least one of the following:
  a class of destination application type; and
  a class of destination device type; and
 (3) class of content type at least one instance thereof including:
  an image;
  text; and
  an attachment;
 at least one instance of the class of content type being deemed contraband, wherein an instance of the contraband includes at least one of the following:
  blacklisted imagery including a visual depiction of at least one of nudity, sexual conduct, excretory functions, gore and hate-speech;
  text blacklisted as being at least one of lewd, vulgar, obscene, prurient, pornographic and hate-speech; and
  an attachment which includes one or more undesirable components;

using the evaluation engine to analyse said would-be-transmission according to the set of control criteria thereby to determine whether said would-be-transmission is permitted to be transferred from the computer; and providing a censorship control function for determining if at least one pre-transfer censorship action should be performed upon said would-be-transmission based on the analysis.

2. The non-transitory computer-readable medium of claim 1, wherein the method further comprises providing a display function for notifying a user that the would-be-transmission will not be transferred as is if the analysis indicates that at least one pre-transfer censorship action should be performed.

3. The non-transitory computer-readable medium of claim 1, wherein the method further comprises permitting, if the analysis indicates that pre-transfer censorship action need not be performed, said would-be-transmission to be transferred as is.

4. The non-transitory computer-readable medium of claim 1 wherein said at least one pre-transfer censorship action includes one or more of:
completely blocking the transfer said would-be-transmission;
transferring said would-be transmission in modified form; and
transferring said would-be transmission in truncated form.

5. The computer-implemented method of claim 1, wherein at east one example of the image includes:
a photograph.

6. The computer-implemented method of claim 1, wherein at least one instance of the class of source-user type includes at least one of the following:
a person at least 18 years of age; and
a person under 18 years of age.

7. The computer-implemented method of claim 1, wherein at least one instance of the class of recipient-user type includes at least one of the following:
a classmate of a user of the computer;
a parent-approved person; and
a person at least 18 years of age.

8. The computer-implemented method of claim 1, wherein at least one instance of the class of destination application type includes at least one of the following:
an email application;
a given URI of a website;
a text-messaging application;
a photo-messaging application;
a photo-sharing application;
a social-media application; and
a social-networking application.

9. The computer-implemented method of claim 1, wherein at least one instance of the class of destination device type includes at least one of the following:
a mobile phone;
a tablet computer;
a laptop computer;
a desktop computer; and
a computer that is not one of a tablet-computer, a laptop computer and a desktop computer.

10. The computer-implemented method of claim 1, wherein:
at least one instance of the class of source-user type includes at least one of the following:
a person at least 18 years of age; and
a person under 18 years of age;
at least one instance of the class of recipient-user type includes at least one of the following:
a classmate of a user of the computer;
a parent-approved person; and
a person at least 18 years of age;
at least one instance of the class of destination application type includes at least one of the following:
an email application;
a given URL of a website;
a text-messaging application;
a photo-messaging application;
a photo-sharing application;
a social-media application; and
a social-networking application; and
at least one instance of the class of destination device type includes at least one of the following:
a mobile phone;
a tablet computer;
a laptop computer;
a desktop computer; and
a computer that is not one of a tablet-computer, a laptop computer and a desktop computer.

11. A computer-implemented method executable by a computer for selectively controlling a transfer therefrom of content located thereon, the computer-implemented method comprising:
fetching a would-be-transmission located on the computer for analysis;
analysing said would-be-transmission by applying a set of predetermined control criteria thereto;
the set of predetermined control criteria including:
(1) at least one of the following:
a class of source-user type; and
a class of recipient-user type;
(2) at least one of the following:
a class of destination application type; and
a class of destination device type; and
(3) a class of content type at least one instance thereof including:
an image;
text; and
an attachment;
at least one instance of the class of content type being deemed contraband, wherein an instance of the contraband includes at least one of the following:
blacklisted imagery including a visual depiction of at least one of nudity, sexual conduct, excretory functions, gore and hate-speech;
text blacklisted as being at least one of lewd, vulgar, obscene, prurient, pornographic and hate-speech; and
an attachment which includes one or more undesirable components;
based upon said analysis, determining if at least one pre-transfer censorship action should be performed upon said would-be transmission.

12. The computer-implemented method of claim 11 wherein said at least one pre-transfer censorship action includes one or more of:
completely blocking the transfer of said would-be transmission,
transferring said would-be transmission in modified form, or
transferring said would-be transmission in truncated form; and
wherein the computer-implemented method further comprises:

permitting, if the analysis indicates that pre-transfer censorship action need not be performed, said would-be-transmission to be transferred as is.

13. The computer-implemented method of claim 12 further comprising:
performing one of the pre-transfer actions before transferring the would-be-transmission.

14. The computer-implemented method of claim 11, wherein at least one example of the image includes:
a photograph.

15. The computer-implemented method of claim 11, wherein at least one instance of the class of source-user type includes at least one of the following:
a person at least 18 years of age; and
a person under 18 years of age.

16. The computer-implemented method of claim 11, wherein at least one instance of the class of recipient-user type includes at least one of the following:
a classmate of a user of the computer;
a parent-approved person; and
a person at least 18 years of age.

17. The computer-implemented method of claim 11, wherein at least one instance of the class of destination application type includes at least one of the following:
an email application;
a given URI of a website;
a text-messaging application;
a photo-messaging application;
a photo-sharing application;
a social-media application; and
a social-networking application.

18. The computer-implemented method of claim 11, wherein at least one instance of the class of destination device type includes at least one of the following:
a mobile phone;
a tablet computer;
a laptop computer;
a desktop computer; and
a computer that is not one of a tablet-computer, a laptop computer and a desktop computer.

19. The computer-implemented method of claim 11, wherein:
at least one instance of the class of source-user type includes at least one of the following:
a person at least 18 years of age; and
a person under 18 years of age;
at least one instance of the class of recipient-user type includes at least one of the following:
a classmate of a user of the computer;
a parent-approved person; and
a person at least 18 years of age;
at least one instance of the class of destination application type includes at least one of the following:
an email application;
a given URL of a website;
a text-messaging application;
a photo-messaging application;
a photo-sharing application;
a social-media application; and
a social-networking application; and
at least one instance of the class of destination device type includes at least one of the following:
a mobile phone;
a tablet computer;
a laptop computer;
a desktop computer; and
a computer that is not one of a tablet-computer, a laptop computer and a desktop computer.

* * * * *